Patented Oct. 9, 1951

2,570,890

UNITED STATES PATENT OFFICE 2,570,890

META-PHTHALIC ACID ANHYDRIDE AND METHOD OF MAKING SAME

George Walton, Cincinnati, Ohio

No Drawing. Application October 15, 1948, Serial No. 54,823

8 Claims. (Cl. 260—342.5)

This invention relates to derivatives of meta-phthalic acid and more particularly relates to the anhydride of meta-phthalic acid and to methods of making meta-phthalic acid anhydride.

Heretofore, the anhydride of meta-phthalic acid has not been known. The anhydride of ortho-phthalic acid is common, but methods by which ortho-phthalic acid anhydride is prepared have not successfully produced the anhydride of meta-phthalic acid.

A primary object of this invention is to prepare the anhydride of meta-phthalic acid.

A further object of this invention is to provide a method for preparing the anhydride of meta-phthalic acid, which will be referred to hereinafter as "meta-phthalic anhydride."

Briefly, the present invention is based on the discovery that a salt of meta-phthalic acid and a di-valent metal, for example the meta-phthalate of di-valent lead, copper or calcium, can be transformed by treatment with applied heat or by exposing to ultra-violet radiation, into a mixture containing meta-phthalic anhydride. The meta-phthalic anhydride may be separated from residual oxides, metal salts, and other by-products by heating to temperatures in the neighborhood of 500 to 850 degrees Fahrenheit, at which temperatures the meta-phthalic anhydride may be separated by sublimation. On cooling, the meta-phthalic anhydride crystallizes in the form of slender, long, transparent to white needles or feathers. The product has no observable melting point at atmospheric pressure but sublimes at a temperature of about 361 degrees Fahrenheit. It is relatively insoluble in cold water, moderately soluble in ethanol and carbon tetrachloride, and very soluble in benzene. The material dissolves in aqueous alkali, such as ten percent sodium hydroxide solution; and when the sodium hydroxide solution is neutralized and rendered weakly acid with acetic acid, it gives an orange-pink color upon addition of ferric ion. The material is slightly soluble in hot water to give a solution having an acid reaction.

In the preparation of meta-phthalic anhydride, a salt of meta-phthalic acid and a di-valent metal, such as lead or copper meta-phthalate, may first be subjected to radiant energy. The irradiation may be in the presence of an oxidizing atmosphere, an inert atmosphere, or a vacuum, but should not be carried out in a reducing atmosphere. The exposure of the di-valent metal salts of meta-phthalic acid to radiant energy may be in the dry state or in the vapor state.

After irradiation of the salt, the product may be removed by heating the mixed reaction product to temperatures between 500 degrees Fahrenheit and 850 degrees Fahrenheit, the optimum temperature being about 700 degrees Fahrenheit. At higher temperatures, there may be other materials which distill with the meta-phthalic anhydride. The anhydride may be separated from these other materials which may distill with it by re-sublimation, extraction with a solvent such as benzene, or by other suitable separation methods.

The same product is obtained when the salt is heated alone to slightly higher optimum temperatures. For example, the optimum temperature for preparing meta-phthalic anhydride by heating of the meta-phthalate of di-valent lead alone appears to be approximately 800 degrees Fahrenheit. Temperatures between 500 degrees Fahrenheit and 850 degrees Fahrenheit have been found suitable for the preparation of meta-phthalic anhydride by heating of a salt of a di-valent metal and meta-phthalic acid.

The following examples illustrate the invention more specifically, but the invention is not intended to be limited by the examples except as set out in the appended claims.

Example I

A sample of the meta-phthalate of di-valent lead having a white color was placed in an oxidizing atmosphere (air) and subjected to the action of ultra-violet light of about 2000 Angstrom units for a period of 90 minutes after which the color had changed to a color of red-orange to buff.

The irradiated mixture was then heated in an enclosed glass reaction vessel in the presnce of air to a temperature of between 700 degrees Fahrenheit and 800 degrees Fahrenheit for 10 minutes. Slender transparent to white needles and feathers of meta-phthalic anhydride were condensed in a cooler zone of the reaction vessel.

Example II

A second sample of the meta-phthalate of di-valent lead was placed in an enclosed glass reaction vessel in an oxidizing atmosphere (air) and heated to a temperature of between 750 degrees Fahrenheit and 850 degrees Fahrenheit for 10 minutes.

Slender transparent to white needles and feathers of meta-phthalic anhydride sublimed and condensed in cooler parts of the reaction vessel.

*Example III*

A sample of anhydrous cupric meta-phthalate was placed in an enclosed glass reaction vessel in an oxidizing atmosphere (air) and heated to a temperature of between 700 degrees Fahrenheit and 850 degrees Fahrenheit for 10 minutes.

Slender transparent to white needles and feathers of meta-phthalic anhydride were condensed in cooler parts of the reaction vessel.

*Example IV*

A sample of anhydrous calcium meta-phthalate was placed in an enclosed glass reaction vessel in an oxidizing atmosphere (air) and heated to a temperature of approximately 800 degrees Fahrenheit for 20 minutes.

Slender transparent to white needles and feathers of meta-phthalic anhydride sublimed and condensed in cooler parts of the reaction vessel.

The product of each example was found to sublime at a temperature of about 361 degrees Fahrenheit but did not have any observable melting point at atmospheric pressure. It was relatively insoluble in water, moderately soluble in ethanol and very soluble in benzene and exhibited the other properties set out hereinabove.

In each of Examples II to IV, the salt of a di-valent metal and meta-phthalic acid is heated for a sufficient time and to a temperature to cause formation of meta-phthalic acid anhydride vapor which is separated from residual material as a vapor and then condensed.

Having described my invention, what I claim as novel and desire to secure by Letters Patent is:

1. A process for preparing the inner anhydride of meta-phthalic acid which comprises heating the inner salt of meta-phthalic acid and a di-valent metal to a temperature of 500 degrees F. to approximately 850 degrees F. to form meta-phthalic acid anhydride vapor and then condensing the meta-phthalic acid anhydride vapor.

2. A process for preparing the inner anhydride of meta-phthalic acid which comprises heating the inner salt of meta-phthalic acid and a di-valent metal selected from the group consisting of lead, copper, and calcium to a temperature of 500 degrees F. to about 850 degrees F. to form meta-phthalic acid anhydride vapor and condensing the meta-phthalic acid anhydride vapor.

3. A process for preparing the inner anhydride of meta-phthalic acid which comprises heating the inner salt of meta-phthalic acid and a di-valent metal to a temperature of approximately 750 degrees Fahrenheit to 850 degrees Fahrenheit to form meta-phthalic acid anhydride vapor, and condensing the meta-phthalic acid anhydride.

4. A process for preparing the inner anhydride of meta-phthalic acid which comprises heating the inner meta-phthalate of di-valent lead to a temperature of 500 degrees Fahrenheit to 850 degrees Fahrenheit to form meta-phthalic acid anhydride vapor, and condensing the meta-phthalic acid anhydride.

5. A process for preparing the inner anhydride of meta-phthalic acid which comprises heating the inner cupric meta-phthalate to a temperature of 500 degrees Fahrenheit to 850 degrees Fahrenheit to form meta-phthalic acid anhydride vapor, and condensing the meta-phthalic acid anhydride.

6. A process for preparing the inner anhydride of meta-phthalic acid which comprises heating the inner meta-phthalate of di-valent lead to a temperature of 750 degrees Fahrenheit to about 850 degrees Fahrenheit for approximately 10 minutes to form meta-phthalic acid anhydride vapor, and condensing the meta-phthalic acid anhydride vapor.

7. A process for preparing the inner anhydride of meta-phthalic acid which comprises heating the inner calcium meta-phthalate to a temperature of approximately 800 degrees Fahrenheit to form meta-phthalic acid anhydride vapor, and condensing the meta-phthalic acid anhydride.

8. The inner anhydride of meta-phthalic acid.

GEORGE WALTON.

REFERENCES CITED

The following references are of record in the file of this patent:

UNITED STATES PATENTS

| Number | Name | Date |
|---|---|---|
| 2,101,868 | Mugdan et al. | Dec. 14, 1937 |
| 2,116,656 | Dreyfus | May 10, 1938 |
| 2,439,203 | Ellingboe | Apr. 6, 1948 |
| 2,443,494 | Cass | June 15, 1948 |

OTHER REFERENCES

Bucher et al., J. A. C. S., vol. 31, pp. 1319–1321 (1909).